CHARACTER RECOGNITION SYSTEM

Original Filed March 3, 1959 3 Sheets-Sheet 1

INVENTOR.
IVAN FLORES
BY [signature]
ATTORNEY

INVENTOR.
IVAN FLORES
BY Richard Franklin
ATTORNEY

INVENTOR.
IVAN FLORES
BY Richard Franklin
ATTORNEY

United States Patent Office 3,391,387

Patented July 2, 1968

3,391,387

CHARACTER RECOGNITION SYSTEM

Ivan Flores, Norwalk, Conn., assignor to Sperry Rand Corporation, New York, N.Y., a corporation of Delaware Continuation of application Ser. No. 796,960, Mar. 3, 1959. This application July 17, 1967, Ser. No. 654,020
8 Claims. (Cl. 340—146.3)

ABSTRACT OF THE DISCLOSURE

A character reader for reading visually identifiable conventional alphabetic or numeric characters which have been imprinted on a document and in which the characters so imprinted comprise one or more vertically arranged magnetic ink bars disposed to form at least a portion of the identifiable characters. The vertical bars comprising the characters are coded in width and position so as to have edges which are uniquely spaced for each character. The characters are adapted to be sensed by a magnetic head which produces a different waveform pattern for each different character. A storage register is used to store the signals sensed by the magnetic head and to provide a binary signal output which is indicative of the character sensed.

Figure 1A:
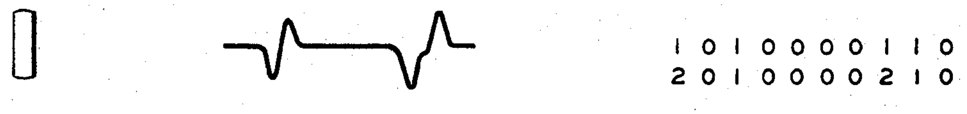
Figure 1B:
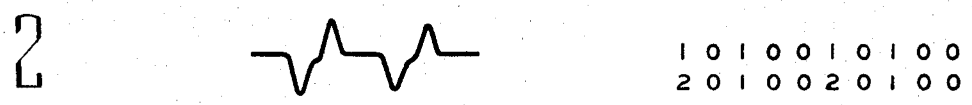
Figure 1C:
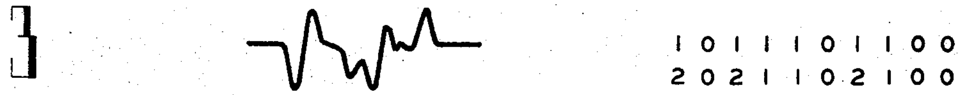
Figure 1D:

This invention is a continuation of my application Ser. No. 796,960 filed Mar. 3, 1959 (now abandoned) and relates to systems whereby documents having visually identifiable information printed thereon may be automatically read by machine. More particularly, it relates to a system for automatically reading information units representing visually identifiable intelligence characters, such units having respective distinct magnetic configurations so as to produce respective characteristic signal trains as a result of such reading.

Existing data processing equipment is limited in its practical speed by the rapidity with which information in its normal form as it appears on commercial documents, records, invoices, checks, and the like, can be converted into a machine-recognizable code. The human operation of preparing machine inputs from such conventional data by visually reading information units into a coded system of tape or punched cards, is inherently slow or else requires a large number of personnel. In addition, such operation permits the introduction of transcription errors, thus requiring expensive error-detection devices and/or techniques.

Various attempts have been made to overcome these problems and fill the gap between raw data and the computer by providing for the automatic machine reading of business data and the like. One attempt has been to stylize information units so that each has a unique form that is capable of being read by a reading system. Developments in this have successively sacrificed more and more of the data's normal visual identity to permit reliable automatic reading, with the result that the information has not been capable of convenient use in human operations.

It is, accordingly, an object of this invention to provide a system capable of automatically reading documents bearing information units which are readily visually identifiable.

It is a further object of this invention to provide a system capable of automatically reading documents bearing magnetically printed information units which are readily identifiable to the human eye.

It is another object of this invention to provide a document bearing magnetically printed information units which are configured so as to be both readily visually identifiable and at the same time capable of being automatically machine read.

It is a further object of this invention to provide a system capable of automatically reading documents bearing magnetically printed information units which are readily identifiable to the human eye, and of utilizing both positive and negative signals produced by such reading.

Generally speaking, in accordance with the invention, a document is provided having information units which are both visually identifiable and machine recognizable printed thereon. Each information unit is stylized so as to include a particular configuration of magnetic ink bars. Each such distinct information unit, when sensed by a magnetic sensing device, will produce a unique train of positive and negative-going pulses determined by the location of the leading and trailing edges of the bars defining each unit. Both the positive and negative-going portions of pulse trains so produced may be utilized. The pulse train representing each character is time-aligned so as to indicate the absence as well as the presence of possible signals, and the information, thus meaningfully arranged, can be utilized by a computer for further operations.

For a better understanding of the invention, together with other and further objects thereof, reference is had to the following description taken in connection with the accompanying drawings.

Figure 1E:
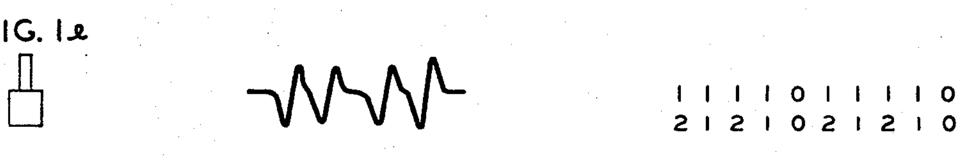
Figure 1F:
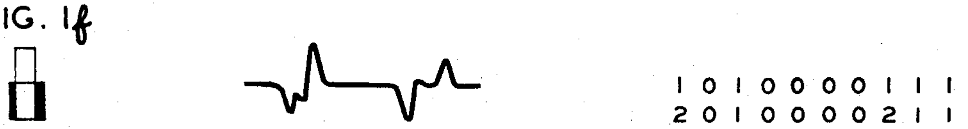
Figure 1G:
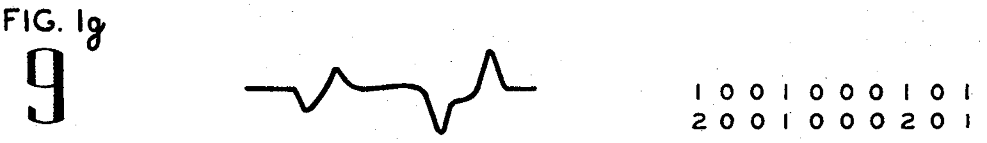
Figure 2:
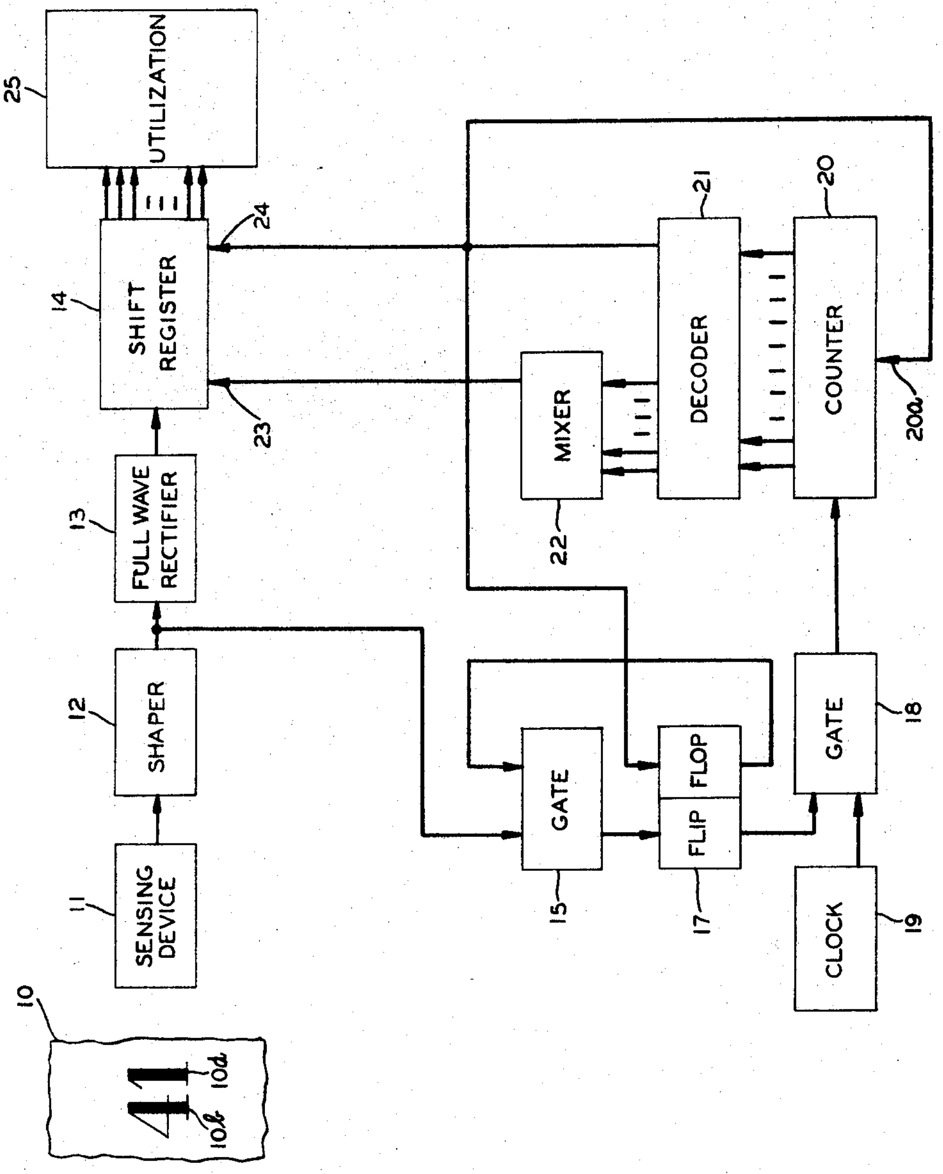

In the drawings,

FIGS. 1*a*–1*g* show information units configured in accordance with an embodiment of this invention and printed in magnetic ink, and also show the corresponding respective wave forms which are produced therefrom when they are read by a magnetic sensing device; and FIG. 2 is a block diagram of a system for reading documents which are magnetically imprinted with information units configured as shown in FIGS. 1*a*–1*g*.

Figure 3:
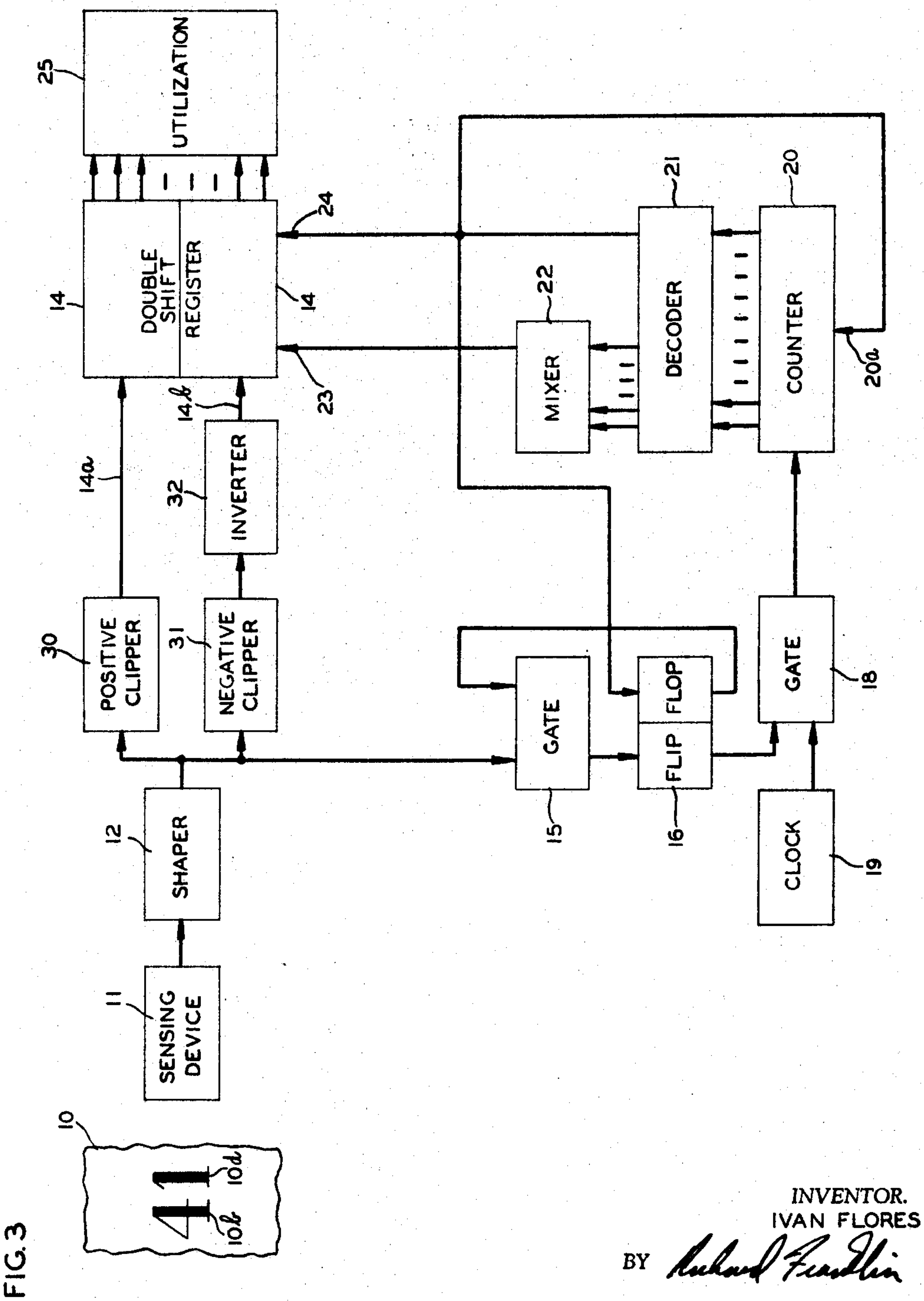

FIG. 3 is a block diagram of a system for reading documents magnetically imprinted with information units configured as shown in FIGS. 1*a*–1*g*, making use of the polarity of positive and negative-going signals produced during such reading.

Referring now to FIGS. 1*a*–1*g*, it is seen from inspection of the waveforms adjacent each numeral, that when such information units, printed in magnetic ink and polarized in a manner well known to the art, are read by a sensing device, each distinct numeral will produce a unique, characteristic waveform. FIGS. 1*a*–1*g* also show the binary and tertiary equivalents as derived from each sensed information unit, and it is apparent from inspection that they, too, are different for each information unit, although the characters which they represent are readily identifiable to the human eye.

The direction of travel of information units such as those shown in FIGS. 1*a*–1*g* relative to the sensing device would be from left to right. The waveforms produced when such a sensing device reads the information units, shown adjacent each information unit, are to be read from right to left. The binary and tertiary equivalents of each wave train are to be read from left to right.

In operation, the magnetic material forming the information units on a document, having been previously properly polarized in a manner well known to the art, passes under a magnetic sensing device, the presence of a vertical magnetic ink bar produces at the output of the device an output signal of one polarity in response to the leading vertical edge of that bar. No further output is produced thereafter until the trailing vertical edge of the bar passes under the sensing device, at which time an output signal of opposite polarity is produced. In the embodiment shown and described herein, for convenience of explanation, the polarity of the signal produced by the leading edges of the vertical bars shall be considered as positive, and that produced by the trailing edges as negative.

Let it be assumed that a chosen number of equal width adjacent segments or cells on a document support are allotted for each information unit. The provision of different width magnetic bars or the absence of a magnetic bar in chosen cells results in the production of a positive or negative signal or of no signal as the sensing device reads each of the cells which comprise a given information unit. Thus the number of cells provided for each information unit determines the number of different information units that can be uniquely represented by different signal trains. In the embodiment shown and described herein, for example, ten cells have been allotted to each information unit. The first cell of every information unit has a magnetic bar located thereon. The signal produced from the leading edge thereof serves to initiate the timing circuitry associated with the system for reading documents having such information units thereon, as will be more fully described hereinbelow.

Production of positive or negative signals within selected cell widths, or the absence of both signals from selected cells permits information to be conveyed in either binary or tertiary code. When the binary code is used, a signal of either polarity represents a first value (e.g. the number 1), and the absence of a signal, a second value (e.g. the number 0). When the tertiary code is employed, signals of one polarity, for example, positive pulses, represent a first value (e.g. the number 2), signals of the other polarity, negative pulses, represent a second value (e.g. the number 1), and the absence of pulses of either polarity represents a third value (e.g. the number 0).

Using the binary code, with the first cell always providing a signal to initiate the timing circuitry there are, effectively, nine cells available to convey unique intelligence combinations or $2^9-1$, viz., 511 theoretical distinct combinations of signals that may be utilized. The production of a waveform having the binary code equivalent 1000000000, is eliminated since it is impossible unless the magnetic material comprising a character is a single block extending beyond the width allowed that character. Thus it is possible to automatically read 511 different alphabetic or numeric characters. If desired, selected cell positions can be used for such purposes as parity checking or the like, instead of as an information conveying portion.

Using the tertiary code there is a substantially greater number of theoretical distinct combinations available to convey intelligence than with the binary code. The large number of available combinations for either the binary or tertiary codes makes it possible to employ certain cell positions and/or certain combinations for error detection and the like. Further as a result of this large number of available combinations, an important feature of this invention is that the combinations which are selected to represent alphabetic and/or numeric intelligence can be chosen so that each figure is readily visually identifiable to the human eye as a conventional alphabetic or numeric character.

It is clear from examination of FIGS. 1*a*–1*g* that the uniqueness of the signal trains and hence the uniqueness of their corresponding binary or tertiary equivalents is achieved without loss of the visual recognizability of the respective information units. Each unit remains readily visually identifiable, and hence may be used in human operations for conventional purposes.

In FIG. 1, referring specifically to FIGS. 1*e* and 1*f*, there are shown therein possible alternate configurations of information units representing the numeral "8," the waveforms produced when these configurations are read by a sensing device, and their corresponding binary and tertiary equivalents. This is shown as an example of the adaptability and flexibility of the information unit stylization of the invention.

It is to be noted that, although each vertical magnetic ink bar has at least two edges, i.e. a leading edge first sensed by the magnetic sensing device and a trailing edge thereafter sensed by the magnetic sensing device, any given bar may have more than two edges. For example, in FIG. 1*c* there is shown the numeral "3" configured in accordance with this invention. In this figure the first vertical bar, reading from right to left, would present to a magnetic sensing device two leading edges and two trailing edges, the respective edges being laterally displaced from each other.

Although examples of alphabetic characters configured in accordance with the invention are not shown though the number "0" might be considered to be the letter "O," it is clear that alphabetic characters may be similarly fashioned with similar results.

Referring now to FIG. 2, wherein there is shown a machine for reading documents magnetically printed with information units of the kind shown and described with reference to FIGS. 1*a*–1*g*, a document 10 is provided bearing magnetically printed information units **10*a* and 10*b*. Information units 10*a* and 10*b***, representing numeral "41" are configured in accordance with the invention. All of the circuits represented by blocks in FIG. 2 are well known in the art and their detailed description is, accordingly, deemed to be unnecessary.

As the initial figure **10*a*, on document 10, printed in magnetic ink and polarized in a manner well known to the art, passes beneath sensing device 11** which may be any device capable of generating electric signals in response to a changing pattern of polarized magnetic bars, a train of signals is produced of the kind shown in FIGS. 1*a* to 1*g*. This train of signals is amplified and suitably formed in shaper stage 12, the output of which is applied to a full wave rectifier stage 13. Shaper 12 may be simply an amplifier stage, or may additionally include other elements such as amplitude discriminator means, differentiating means, or the like. Rectifier stage 13 is a full wave rectifier producing an output signal of a chosen polarity in response to each input signal of either polarity, and might for example, be a pair of parallel, oppositely poled unidirectional elements suitably biased. The circuit values of rectifier stage 13 may be so chosen that it produces an output in response to signals having a predetermined amplitude. The output signals, having a uniform polarity, from rectifier stage 13 are serially entered in shifting register stage 14. Shifting register 14 might comprise a chain of bistable devices responsive to external shift signals whereby upon application of such a shift signal the state of operation of each of the bistable devices is transferred to the next bistable device in the chain. One such device is shown in U.S. Pat. 2,834,006 to Kaufmann, assigned to the common assignee, wherein a shift register using bistable magnetic devices, is described. Shifting register 14 has applied thereto, in addition to the input signals from the rectifier 13, signals at a shift input 23, and a signal at a readout input 24 from a mixer 22 and a shift decoder 21 respectively as will be further explained.

The first output signal from amplifier 12 as each information unit passes beneath sensing device 11, is always of the same polarity since it is always in response to the leading edge of an information unit. The first output signal is also applied as one input to a gate 15, which in the embodiment shown in FIG. 2, is the type which requires a coincidence of two inputs to produce an output. Gate 15 is normally maintained in an open state by another input applied thereto from a flip-flop stage 17. Flip-flop 17 may be any conventional bistable device which provides a first output in one stable state, and a second output in its other stable state.

In operation, the output from gate 15, produced in response to the coincident application thereto of the first output from amplifier 12 and the signal from flip-flop 17 when it is in a first conductivity state, is applied as a first input to flip-flop 17. Flip-flop 17 is thereby switched to the other of its stable states, thus removing one of the inputs to gate 15. Gate 15 is thereafter closed to further outputs from amplifier 12 until flip-flop 17 is switched back to its first conductivity state by the application of a signal to its other input, as will be described more fully below.

The output from flipflop 17, when it is in its other stable state, is applied as one input to gate 18 which produces an output upon the coincident application of two inputs thereto. The second input to gate 18 is received from a clock stage 19. Clock 19 may be a free-running multivibrator having a chosen frequency at least as great as the rate at which the sensing device "reads" the cells comprising each information unit. The frequency of clock 19 may be, for example, such that it produces 7 outputs during the time allotted for the reading of each cell of an information unit, by sensing device 11. The frequency of clock 19 should be sufficiently greater than the rate at which each cell of the information units is sensed, so as to insure that at least one of the signals produced during the interval during which a cell is sensed will be properly located in time to be selected for application to shift register 14.

When gate 18 is opened by an output signal from flipflop 17, clock outputs are delivered therethrough and applied to a binary counter stage 20 which, in the embodiment shown, may be a plurality of coupled flipflop circuits, the counter stage being chosen to operate at the clock frequency. The counter 20 converts the train of pulses into a series of binary patterns, one corresponding to each of the input signals applied thereto. These binary patterns are applied to decoder stage 21 which may be for example, a number of suitable connected sets of gates arranged in a matrix so as to respond to predetermined ones of the patterns of signals from counter 20. Decoder 21 produces an output signal which is applied to mixer 22, upon the occurrence of each of said predetermined patterns signals from counter 20. One such type of decoder is shown in U.S. Pat. No. 2,846,671 to Yetter, assigned to a common assignee which describes a magnetic matrix capable of translating a binary coded pattern into an output on a particular line. Chosen ones of such lines could be selected to be connected to mixer 22. Output signals from decoder 21 are fed to a mixer stage 22, which in the embodiment shown might be an "OR" gate of the type which provides an output signal on a single line corresponding to each input signal thereto in addition to isolating the various output lines of decoder 21 from each other.

A single scale of $n$ counter, where $n$ represents the number of pulses produced by clock 19 during the time a given cell is read by sensing device 11, could be employed in place of counter 20 and decoder 21 so as to produce an output after each cell is read. However, by virtue of the arrangement illustrated in this figure, the system is capable of reading information units of varying widths on different occasions. Decoder 21 can be set to respond to any one of the output patterns from counter 20, such as, for example, the 7th, 14th, 21st, etc., depending upon the rate at which clock 19 produces outputs relative to the time it takes sensing device 11 to read each cell. Thus, although the width of the information units on any given document must be uniform, and further the width of the information units on all documents of any given "run" through the machine must be uniform, greater flexibility is provided by the embodiment shown in that on separate "runs," different width cells could be used. Further, the embodiment shown can be used to read information units wherein any one or more of the given cell positions can differ in width from other cell positions. That is, should visual recognizability require it, the decoder of the embodiment shown could be set to enable the machine to read documents coded so that, while the 1st, 2nd, 4th, 6th, 7th, 8th, 9th and 10th cells are all of a uniform width, the 3rd could be wider or narrower than the others, and the 5th could be the same as the 3rd or totally different from any of the others. The only limitation, then, placed on the flexibility of the system shown in this embodiment is that the decoder matrix must be set beforehand, and hence cells occupying corresponding positions within the information units must be uniform on any particular "run" and these widths cannot vary until the decoder matrix has been changed.

The output signals from mixer 22, each corresponding to one input signal thereto, are applied as shift signals to shift input 23 of shift register 14. By virtue of the fact that clock 19 produces a plurality of pulses during the time each information unit cell is sensed, decoder 21 can be used to adjust the timing of the system. Decoder 21 is set so that the signals provided at shift input 23 arrive from mixer 22 during the intervals between information signals that may be detected by sensing device 11.

When the information units shown in and described in connection with FIGS. 1*a*–1*g* have allotted thereto "*n*" cells or time segments for the binary representation thereof, then $n-1$ shift input signals are required to permit the entry of all possible information signals relating to a particular information unit in a shift register 14. Thus, where ten cells are allotted each information unit, nine shift signals are required.

Shift register 14 is shifted by a signal applied at shift input 23, between each adjacent cell period, independently of whether or not a signal was produced at sensing device 11 during the sensing of any particular cell. Therefore, assuming an information unit having ten possible cell positions, and assuming that a particular information unit produces a train of signals in the first, second, sixth and tenth cell positions, the signals stored in shift register 14 are similarly to be located in the first, second, sixth and tenth positions, reading from right to left.

The last signal produced by decoder 21 is chosen so as to occur after the signal, if any, which results from the sensing of the last cell of the information unit then being read by sensing device 11, has been entered in shift register 14. This last signal is applied directly to shift register 14 at readout input 24. Upon the application of this last signal from decoder 21 to shift register 14, the information stored in shift register 14 is read out in parallel, i.e., a pattern of output signals are produced therefrom which are applied to a utilization device 25 which may then further transform or process the information.

The last output from decoder 21 is also applied as the second input to flipflop 17 thereby switching flipflop 17 back to its first conductivity state. This removes one input to gate 18 and that gate is thereafter closed, preventing further signals from clock 19 from passing therethrough. In its first conductivity state, the output from flipflop 17 again provides an input to gate 15, thereby opening that gate to the first signal produced when the leading edge of the first bar in a following information unit is sensed by sensing device 11.

The last output from shift decoder 21 is also applied to reset input 20*a* of counter 20, zeroizing the counter to insure that it is ready for the sensing of the next information unit.

Gate 15, flipflop 17, gate 18, clock 19, counter 20, decoder 21, and mixer 22, in combination with shift register 14, provides a timing circuit for the system. In operation, the timing circuit permits the absence of an edge of a magnetic bar in any of the cells comprising an information unit, to be reflected by the absence of a signal at corresponding positions in the shift register. In other words, when the leading or trailing edge of a bar is detected within a cell by sensing device 11, a signal of a first kind, for example, corresponding to a binary one, is entered in a stage of shift register 14, through full wave rectifier 13. When no bar edge is detected in a cell, the timing circuit causes a signal of a second kind to be entered in a stage of shift register 14, i.e. the absence of a signal in that shift register stage which corresponds to a binary zero, by shifting the register forward one stage even though no signal has been entered therein.

Referring now to FIG. 3 wherein a variation of the document reading system of FIG. 2 is shown, the same reference numerals are used to denote like stages common to the two systems. In this system, as document 10 passes beneath sensing device 11, the magnetic deposits on the document forming information units 10*a* and 10*b* sequentially cause signals to be produced in sensing device 11, as set forth above in connection with the description of FIG. 2.

These signals are applied to shaper 12 which provides a uniform pulse at its output of the same polarity as each input signal applied thereto. The first signal produced by each information unit, always due to the sensing of a leading edge of a bar by sensing device 11, and hence always of the same polarity, is applied to gate 15. The function and operation of the timing circuit including stages 15, 17, 18, 19, 20, 21, and 22 are the same as in FIG. 2.

The first signal induced in sensing device 11 and all subsequent signals induced therein by the information units, are suitably amplified and shaped in shaper 12 as described above. Pulses from shaper 12 are applied to positive clipper 30 and negative clipper 31. Positive and negative clippers 30 and 31 may be, for example, suitably biased oppositely poled unidirectional elements which pass negative and positive pulses respectively. The positive pulses passed by negative clipper 31 are inverted in inverter 32 which may be a suitable biased amplifier stage. As a result of the inversion of these positive pulses, negative signals are applied to each of the inputs 14*a* and 14*b* of double shift register 14. Shift register 14 in this embodiment, may be two separate shift registers, each having an equal number of cells within which signals may be stored. If desired, shift register 14 could be arranged so as to accept positive inputs instead of negative inputs, in which case inverter 32 would be placed in series with positive clipper 30. Alternatively shift register 14 could be arranged so that input 14*a* would accept negative pules and input 14*b* would accept positive pulses. Each shift pulse produced by the timing circuit advances both parts of shift register 14 as was explained in connection with the single shift register 14 of FIG. 2. This produces a pattern of first and second signals in each part of double shift register 14, i.e., the presence of a stored pulse in certain register cells and the absence of pulses in the other of the cells. Stored pulses in one part of double shift register 14 could represent the tertiary value two, and stored pulses in the other part of register 14 could represent the tertiary value one. The absence of a stored pulse in corresponding cells of both register parts represents the tertiary value zero. Since both register parts contain an equal number of cells, and since both parts are simultaneously shifted following the time each signal may be received, a signal representing a 1 and a signal representing a 2 cannot co-exist in corresponding units of their respective register parts.

Summarizing the above, the system of FIG. 2 produces a unique binary signal train for each distinct information unit of the type shown in FIGS. 1*a*–1*g* which is read by it; the presence of a bar edge in any cell providing a first signal, e.g. a binary 1; the absence of a bar edge in any cell providing a second signal, e.e., a binary 0. The system of FIG. 3 produces a unique tertiary signal train for each distinct information unit of the type shown in FIGS. 1*a*–1*g* read by it; the presence of a leading bar edge in any cell providing a first signal, e.g. a tertiary 2; the presence of a trailing edge in any cell providing a second signal, e.g. a tertiary 1; the absence of both a leading edge and a trailing edge in any cell providing a third signal, e.g. a teritary 0.

While this application shows and describes certain preferred embodiments of the invention and the best mode in which it is contemplated employing that invention, it should be understood that modifications and changes may be made without departing from the spirit and scope thereof, as will be clear to those skilled in the art.

What I claim is:

1. A system for sensing an area of coded magnetic material on a support and deriving therefrom a binary representation of the waveform produced when said material is sensed, comprising a sensing device, a shift register connected to said sensing device, timing means connected to said shift register, said timing means, sensing device and shift regster cooperating to provide a signal of one kind when a first condition of magnetization is present on said support and a signal of a second kind when another condition of magnetization is present thereon, said timing means comprising a first gate having two inputs and an output for producing a signal at said output upon each coincident application of signals at said inputs, one of said inputs being coupled to the output of said sensing device, a bistable device having two inputs and two outputs, said bistable device providing a signal at one output in response to one of its stable states and a signal at its other output in response to the other of its stable states, said bistable device being normally in said one stable state, said one output of said bistable device being coupled to the other of said inputs of said gate, one input of said bistable device being coupled to the output of said gate, a second gate having two inputs and an output for producing a signal at its output in response to the coincident application of signals at its inputs, one of its inputs being coupled to the other output of said bistable device, a free-running multivibrator for producing clock signals, said clock signals produced by said multivibrator being applied as the other input to said second gate, counter means having an input coupled to the output of said second gate and a plurality of outputs for producing sequentially occurring signals at chosen respective ones of said outputs in response to respective predetermined numbers of clock signals applied thereto, the last output produced from said counter means being applied to the other input of said bistable device to switch said device back to said one stable state and also being applied to said shift register to read out the information stored therein, said other outputs of said counter means being sequentially applied to said shift register to shift information serially stored therein, said other outputs from said counter means being timed so that each is applied to said shift register after any signal detected by said sensing device is stored in said shift register, whereby signals are stored in said shift register which unquely represent the coded information being sensed by said sensing device.

2. A character reading system comprising in combination a document including a support having machine-readable, magnetically printed information units thereon which are readily visually identifiable as conventional alphabetic or numeric characters, each of said units being allotted an equal predetermined width on said support, each of said widths comprising an equal chosen number of adjacent cells, each of said information units comprising at least one substantially vertical magnetic ink bar having a first leading edge within its leading cell, and a first trailing edge within another of its cells, the bars comprising each unit being so disposed as to form at least a portion of a visually identifiable conventional alphabetic or numeric character, and so disposed that each unit provides an arrangement of spaced edges within said plurality of cells different from any other information unit, a magnetic sensing device for producing an output signal of one polarity in response to its sensing each leading edge of said magnetic ink bars and of the opposite polarity in response to its sensing each trailing edge of said magnetic ink bars, each of said output signals occurring within selected ones of said cells, storage means coupled to said sensing device for sequentially storing first signals representing signals of said one polarity produced by said sensing device and second signals representing signals of said other polarity produced by said sensing device, and timing means in circuit with said sensing device and said storage means for providing in said storage means third signals representing the absence of output signals from said sensing device when it senses the other of said cells, whereby each distinct information unit, when sensed by said sensing device, provides a unique combination of said first, second and third signals in said storage device, representing said information unit in tertiary form.

3. The system defined in claim 2 wherein said storage means comprises a shift register having two storage portions, the first storage portion storing signals of said first and third kinds, the second storage portion storing signals of said second and third kind, and means connected between said sensing device and said shift register for applying signals of said first kind to said first storage portion, and for applying signals of said second kind to said second storage portion.

4. The system defined in claim 3 wherein said timing means comprises first means having its input coupled to the output of said sensing device for producing an output signal in response to the first signal applied thereto from said sensing device, clock means for producing a regularly recurring signal at a frequency at least equal to the frequency of the sensing of said cells by said sensing device, second means having its input coupled to one output of said first means and to one output of said clock means for passing said recurring signals only when said first means produces said output signal, third means having its input coupled to one output of said second means for producing output signals only upon the occurrence of selected ones of said signals produced from said second means being one less than the number of cell widths that comprises each of said information units, said output signals from said third means being applied as shifting signals to said shift register, said shifting signals being timed to occur after each signal resulting from the sensing of a cell is stored in said shift register.

5. The system of claim 3 wherein said timing means comprises means for applying a predetermined number of sequential pulses to both storage portions of said shift register in response to the initial signal produced by said sensing device, the number of said sequential pulses being equal to the number of cells comprising each information unit, each of said sequential pulses being timed to occur after the corresponding cell is sensed, all but the last of said sequential pulses shifting said register when applied thereto, said last pulse clearing said register when applied thereto.

6. A document reading system including in combination a document comprising a support bearing magnetically printed information units thereon which are readily visually identifiable as conventional alphabetic or numeric characters, each of said units occupying an equal predetermined plurality of cell widths on said support, each of said information units being configured so as to include at least one substantially vertical magnetic ink bar having a first leading edge within the first of said cell widths comprising said unit, and a first trailing edge within another of said cell widths, said vertical magnetic ink bars being of varying breadths so that each distinct information unit provides a unique arrangement of edges within said plurality of cell widths; a device for reading said document comprising a magnetic sensing device for producing an output signal of a first polarity substantially coincident with the leading edge of each of said vertical magnetic bars and an output signal of the opposite polarity substantially coincident with the trailing edge of each of said vertical magnetic bars, said output signals of either polarity occurring within selected ones of said cell widths, amplifier means having an input coupled to the output of said sensing device for producing an amplifier output signal in response to each input applied thereto, rectifier means coupled to the output of said amplifier means for producing an output signal of a predetermined polarity in response to each input of either polarity applied thereto, shift register means coupled to the output of said rectifier means for serially storing each input applied thereto, gate means having two inputs and an output for producing an output signal on the coincident application of two inputs thereto, means coupling one input of said gate means to the output of said amplifier means, bistable means having two inputs and two outputs, one output of said bistable means being coupled to the other input of said gate means, the output from said gate means being coupled to one input of said bistable means, second gate means having two inputs and an output for producing an output signal upon the coincident application of two input signals thereto, said other output from said bistable means being applied as one input to said second gate means, clock means for producing a continuous, regularly recurring series of signals at its output, said signals from said clock means being applied as the second input signal to said second gate means, counter means having an input and a plurality of outputs, the output of said second gate means being coupled to said input of said counter means, said counter means being adapted to produce at its respective outputs a signal indicating respective predetermined counts of said clock signals, means coupling the outputs of said counter means to the shift input of said shift register means, said counter means and said shift register means being timed so that shift input signals are applied intermediate the arrival of possible signals applied to said shift register from said rectifier, a further output terminal on said counter means for producing a signal upon the completion of the last of a predetermined number of signals from said clock means, said last output signal being applied to the readout terminal of said shift register means for reading out the information serially stored therein, in parallel, said last output from said counter means being also applied to the other input of said bistable means for terminating the signal from said other output thereof and for initiating the signal from said one output thereof, whereby each distinct information unit on said document, when read by said reading device will provide a unique pattern of first and second signals uniquely representing said information unit in binary form.

7. A character reading system comprising in combination a document including a support having machine-readable, magnetically printed information units thereon which are readily visually identifiable as conventional alphabetic or numeric characters, each of said units being allotted an equal predetermined width on said support, each of said widths comprising an equal number of adjacent cells, each of said information units comprising at least one substantially vertical magnetic ink bar having a first leading edge within its leading cell, and a first trailing edge within another of its cells, the bars comprising each unit being so disposed as to form at least a portion of a visually identifiable conventional alphabetic or numeric character, and so disposed that each unit provides an arrangement of spaced edges within said plurality of cells different from any other information unit, a magnetic sensing device for providing an output signal in response to its sensing each leading or trailing edge of said vertical magnetic ink bars, said leading and trailing edges occurring within selected ones of said cells comprising each information unit, shift register means coupled to said sensing device for sequentially storing a signal of a first kind corresponding to each output signal produced by said sensing device, and timing means in circuit with said sensing device and said shift register means for providing in said shift register means second signals corresponding to the absence of an output signal from said sensing device when sensing the other of said cells, whereby each distinct information unit, when sensed by said sensing device, provides a unique combination of said first and second signals and said shift register means representing said information unit in binary form, said timing means comprising means for applying a predetermined number of sequential pulses to said shift register in response to the initial signal produced by said sensing device, said number being equal to the number of cells comprising each information unit, each of said pulses being timed to occur after the corresponding cell is sensed by said sensing device and before the succeeding cell is sensed, all but the last of said sequential pulses shifting said register when applied thereto, said last pulse clearing said register when applied thereto.

8. The system defined in claim 7 wherein said timing means comprises first means having its input coupled to the output of said sensing device for producing an output signal in response to the first signal applied thereto from said sensing device, clock means for producing a regularly recurring signal at a frequency at least equal to the rate at which said sensing device senses said cells, second means having its input coupled to one output of said first means and to one output of said clock means for passing said recurring signals only when said first means produces said output signal, third means having its input coupled to one output of said second means for producing output signals only upon the occurrence of selected ones of said signals passing through said second means, the total number of output signals produced from said third means being one less than the number of cell widths that comprise each of said information units, said output signals from said third means being applied as shifting signals to said shift register, said shifting signals being timed to occur after each signal resulting from the sensing of a cell is stored in said shift register.

References Cited

UNITED STATES PATENTS

| | | | |
|---|---|---|---|
| 2,961,649 | 11/1960 | Eldredge et al. ----- | 340—146.3 |
| 2,992,408 | 7/1961 | Eldredge et al. ----- | 340—146.3 |
| 3,114,131 | 12/1963 | Furr et al. | |

MAYNARD R. WILBUR, *Primary Examiner.*